Jan. 4, 1955 P. W. HARLAND 2,698,633
EVACUATED CAPSULE FOR ANEROID BAROMETERS
Filed May 9, 1952
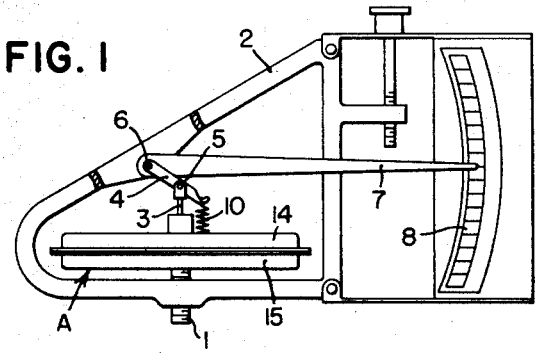
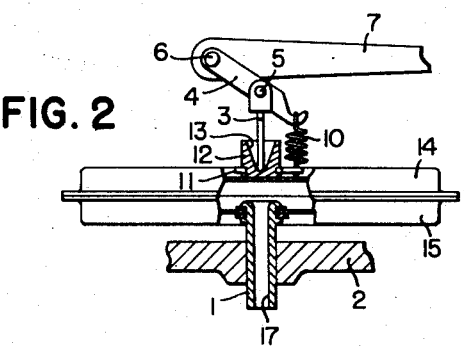
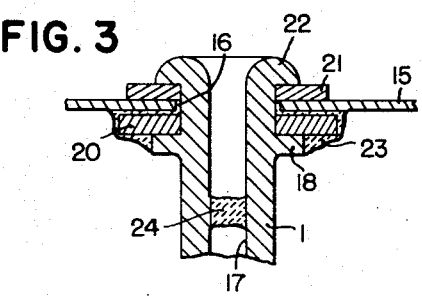
INVENTOR.
Philip W. Harland
BY
Bruno C. Lechler
ATTORNEY

United States Patent Office 2,698,633
Patented Jan. 4, 1955

2,698,633

EVACUATED CAPSULE FOR ANEROID BAROMETERS

Philip W. Harland, Sellersville, Pa., assignor to American Machine and Metals, Inc., New York, N. Y., a corporation of Delaware Application May 9, 1952, Serial No. 287,073

5 Claims. (Cl. 137—795)

The invention relates to the construction of an altimeter or aneroid barometer designed for use in areas of widely varying temperatures whose indication remains unaffected by the ambient temperature.

Such an altimeter is particularly well adapted for uses in which the altimeter is very rapidly carried from one atmospheric strata to another. For example, in connection with a balloon designed to rise to very high altitudes and transmit the atmospheric conditions at those strata back to earth. The wider the range of elevation in which an altimeter is used the more important it is to completely eliminate the effect of temperature changes on its structure. At these very high altitudes the change in ambient pressure per 1000 ft. rise is only a very small part of the change in pressure at low levels. Accordingly an error due to temperature expansion or change in function of any parts of the altimeter creates an increasing error in the readings.

In many of such devices it is common to use a partially exhausted capsule, the initial movement of which, due to variations in the external pressure, is transmitted through a suitable chain of motion transmitting elements to a pointer traversing a gauge calibrated to indicate units of the altitude.

Temperature changes causing changes in the size of the parts of the apparatus as well as in the modulus of elasticity of the material forming the pressure responsive capsule become disturbing factors of increasing importance at the very low temperatures encountered high up in the atmosphere.

In such capsule controlled devices a variation in temperature will affect the reading in three ways: (1) by the expansion of the frame and the motion transmitting elements; (2) by the expansion of the capsule itself; and (3) by the changing modulus of elasticity of the metal forming the capsule. The change in the size of the parts by expansion usually causes a constant error throughout the scale range. Even if the difference of pressure inside and outside the capsule remains the same, the expansion of the capsule will vary if the temperature is changed over a wide range. This expansion is due to the change in the modulus of elasticity of the material of which the capsule is made. In most materials the modulus of elasticity increases quite appreciably with a drop in temperature. For example, in beryllium copper, a drop of only 75 degrees Fahrenheit creates a 2% increase of the modulus of elasticity.

While the insertion of a thermostatic coupling element between the capsule of the type here illustrated and the pointer gives a partial correction which may be satisfactory where the change in altitude is not too great, the correction thus made fully compensate for both the change by the simple elongation of the parts due to temperature changes and the change in the modulus of elasticity of the capsule material with temperature changes.

The invention proposes a capsule built of a material having characteristics not hitherto available constructed in such a manner that the movement of the capsule will be affected by temperature change in such a manner as to offset the effect of temperature changes on the balance of the structure of the altimeter so that only the effect of changing pressure with temperature eliminated will be transmitted to the indicating apparatus.

It should be noted that to obtain a zero temperature coefficient for the complete capsule which is evacuated and subject to collapsing ambient pressure it is not sufficient that the material itself have a zero coefficient of expansion with temperature changes such as Invar. The capsule thickness may change either by the enlargement of the capsule due to temperature expansion of the material or by a change in the modulus of elasticity of the material due to temperature.

The very simple solution herein developed which eliminates the use of a special temperature correcting element has not been possible hitherto because of the difficulty of building a capsule out of a material which will give the capsule all of the desired characteristics. These include:

1. A high modulus of elasticity, usually achieved by heat treatment.
2. Absence of hysteresis.
3. A modulus of elasticity that remains constant over a substantial temperature range.
4. A modulus of elasticity permanent as to time.
5. A temperature coefficient approximating zero.
6. Workability of the material in forming it into cups that form parts of the capsule.
7. The development of techniques which permit supporting the capsule on a tube used for evacuation, without local distortion of the elastic characteristics of the material.
8. Lastly, suitability for use with a heat treatment by which the assembled capsule can be given a slight "drift," positive or negative, which will permit balancing inaccuracies in the rest of the instrument by the inaccuracies created by the drift of the capsule.

Beryllium copper was the metal hitherto available that came nearest to combining these characteristics but sadly deficient as to items 4, 5. Ni-Span-C has all the desired qualities.

In the construction of the capsule two cups are formed which have flanges that permit joining the two cups to form a complete capsule. A post is attached axially to one cup to transmit the motion resulting from the change of the pressure on the capsule and one of the cups is pierced to permit attaching a post having a hollow passage to both support the capsule and permit its evacuation.

Another feature of the invention relates to the means for supporting the capsule on this post in such manner that the capsule will be firmly held on the post, secure against leakage, and yet without reimposing secondary stresses that have been removed during the heat treatment of the parts.

The expansion coefficient of the Ni-Span-C material of the capsule is quite different from that of the post which is made of other material such as brass. To avoid restricting the movement of the portion of the capsule adjacent to its support on the post, the post is given a narrow shoulder on which a heavy washer of Ni-Span-C is supported. The pierced half of the capsule rests upon this heavy washer. Since the Ni-Span-C washer and the disc are of the same material, the expansion of the disc is not affected. To prevent leakage it is desired to solder the Ni-Span-C washer to the shoulder of the post but it is desired to prevent the solder following the shaft of the post to the inner surface of the capsule. To this end an aluminum washer is placed on the inside of the capsule and the hollow brass post is then spun over onto the aluminum washer. The relatively soft aluminum both serves as cushion to prevent an undesirable restraint or clamping of the edges of the hole in the half of the capsule and also stops the flow of solder following the shaft of the hollow brass post.

After a solder pellet has been placed in the hollow post and the capsule evacuated through the post solder is placed on the outside of the post and as heat is applied, both the hollow passage is sealed off and the solder joins the Ni-Span-C washer and the half of the capsule so that the washer is in effect a flange around the opening in the capsule and has the same characteristics as the capsule side. The aluminum washer prevents solder penetrating into the inside of the capsule or beyond the inner face of the capsule.

One object of the invention is to build an altimeter nonresponsive to temperature changes.

Another object of the invention is to build a capsule, suitable for use in an altimeter, of material having a negligible temperature coefficient of expansion. In this manner the inaccuracy caused by temperature is reduced because only the effect of temperature on the motion transmitting elements needs to be corrected, the effect of temperature on the expansion of the capsule itself having been eliminated.

A further object of the invention is to provide, for instruments of this character, a capsule consisting of alloy metal which, when subjected to a proper heat treatment, will have its modulus of elasticity substantially constant under changes of temperature within a predetermined range.

Another object of the invention is to provide an aneroid barometer whose mechanism as a whole is responsive to the ambient pressure but not to temperature changes. This is accomplished by building the capsule from a material which has a controllable "drift" in its modulus of elasticity with the change in temperature that will offset the errors arising from the temperature caused changes in the motion transmitting elements.

A still further object of the invention is to provide, for altimeters and the like, a movement initiating capsule of a suitable alloy which has been heat treated so that variations in the modulus of elasticity of the capsule metal will exactly compensate for errors due to variations under temperature changes of the motion transmitting mechanism of the instrument.

A still further object of the invention is to provide a capsule of this class having novel means for connecting the stem used for supporting the capsule to the frame.

Another object is to build an altimeter actuated by a capsule of heat treated Ni-Span-C.

With the above and other objects in view, as will be hereinafter apparent, the invention consists in general of certain novel details of construction and combinations of parts and further consists in the utilization of a particular alloy and of a particular method of heat treating such alloy.

In the accompanying drawings, like characters of reference indicate like parts in the several views and:

Fig. 1 shows in elevation an altimeter embodying the invention.

Fig. 2 is a section through Fig. 1.

Fig. 3 is a greatly enlarged section showing in detail the manner of attaching the lower post to the capsule walls.

The invention is shown as embodied in an altimeter of the type used in radiosonde balloons, whereby the pressure at the various elevations encountered by the balloon in its rapid ascent, affects a capsule A to move a pointer over a scale. At zero elevation the capsule A, which has been initially evacuated, is in a collapsed condition. The lower half of the capsule is carried on a post 1, threaded into the frame 2. Thus as the balloon rises and the pressure drops, the upper half of the capsule moves upwards since the capsule expands. This expansion and upward movement moves a pin 3 upward. This pin 3 is pivoted to an arm 4 at 5, and the arm 4 is pivoted to the frame at 6. Integral with the arm 4 is the pointer 7 which is thus moved over a scale 8. The pin 3 is held against the bottom of a cone shaped recess 13 in the stem 12 by a spring 10 connected between arm 4 and a ring 11 clipped to the stem 12. The stem 12 is carried by the upper half of the capsule A. The apparatus as thus far described is more fully explained in my copending application No. 265,685 filed January 9, 1952.

The upper half 14 and the lower half 15 of the capsule A are made as separate dished plates, having been formed by conventional forming methods. These plates are made of Ni-Span-C, an alloy of nickel, iron, chromium, titanium, aluminum, manganese, silicon and carbon. This alloy has the very desirable property that by suitable heat treatment it can be given a modulus of elasticity which is either constant over wide temperature ranges or else has a slight increase or decrease over a temperature range. One such alloy which has been found to be satisfactory is composed approximately of nickel 42 parts by weight, iron 48.64 parts, chromium 5.5 parts, titanium 2.5 parts, aluminum 0.4 part, manganese 0.4 part, silicon 0.5 part, carbon 0.06 part.

After the two halves 14 and 15 are formed and heat treated, the stem 12 is directly soldered to the upper half 14. The lower half 15 is pierced by a hole 16 to permit passage of post 1, through which the capsule is evacuated. The post 1 has the bore 17 running therethrough, and a shoulder 18 near its upper end. In assembly a relatively heavy washer 20 of Ni-Span-C is placed on shoulder 18, and the half 15 of the capsule is placed over the post on top of washer 20. On top of member 15 is placed another washer 21, of aluminum. The end of post 1 is then spun over as at 22. The aluminum washer 21 serves two purposes. One is to cushion the spinning-over action so as to not impose stresses on the part 15. The other is to prevent the solder 23 from penetrating to the inside surface of the part 15. This solder 23 is placed in the space adjacent shoulder 18 and washer 20 with the post in inverted position, and is then heated so that it melts and becomes fluid to run to the position shown. The solder cannot go past the washer 21 since it will not adhere to the aluminum. Solder will fill the space in hole 16 between the tube and inner edge of plate 15 and also will be between the heavy washer 20 and plate 15. A solder plug is created in the bore 17 after the capsule is evacuated in a manner generally shown in pending application No. 233,917 filed June 27, 1951, now abandoned, assigned to the same assignee as the present invention.

In the manufacture of altimeters according to the invention the materials comprising the frame 2 and pointer 7 are selected to minimize the effect of temperature changes on the reading of the scale 8. Knowing the correction required, a heat treatment for the Ni-Span-C capsule is selected which will cause a slight "drift" which will offset the remaining inaccuracies in the other parts. Precision testing means are employed to determine the "drift" characteristics of each capsule and in building a number of altimeters that particular capsule having the drift characteristics that will correct for the temperature in accuracy of the other parts is selected for incorporation therein.

What is claimed as new is:

1. An expansible diaphragm having a dished metal plate with a modulus of elasticity substantially constant with thermal changes, said plate having a centrally located aperture therein, a metal tube located in said aperture, said tube having a flange on one side of said plate, a heavy washer of a metal having a modulus of elasticity substantially constant with thermal changes, said heavy washer being between said flange and plate, means on said tube on the opposite side of said plate positioning said flange and heavy washer adjacent said plate, said means including material unwettable by solder and solder joining the tube, washer and plate, said solder being between said heavy washer and plate and between the edges of said aperture in the plate and said tube.

2. An expansible diaphragm having a dished metal plate with a modulus of elasticity substantially constant with thermal changes, said plate having a centrally located aperture therein, a metal tube located in said aperture, said tube having a flange on one side of said plate, a heavy washer of a metal having a modulus of elasticity substantially constant with thermal changes, said heavy washer being between said flange and plate, washer means non-compatible with solder on the opposite side of said plate, means holding said last mentioned washer means on said tube, and solder joining said parts, said solder being between said heavy washer and plate and between the edges of said aperture in the plate and said tube, but not between said washer means non-compatible with solder and said plate and tube.

3. In an evacuated capsule adapted for use in an apparatus responding to ambient pressure changes having a frame with a threaded hole, the combination including a dished plate having a modulus of elasticity substantially constant with thermal change and having an outwardly projecting flange, a stem having an axial conical recess fastened to the center of said plate, a second such dished plate having a central hole, a tube of a metal adapted to be spun over and which is adapted to pass through said central hole, a flange on said tube exteriorly of said plate, a thread on one end of said tube permitting longitudinal adjustment of said tube in said threaded hole, a heavy washer of material having a modulus of elasticity substantially constant with thermal change resting on said flange and bearing against said dished plate and having a central hole, a washer of a soft metal located between the dished plate and means on the tube holding the parts in assembled relationship, and soldering between said heavy washer and tube and between said tube and the central hole in said second plate.

4. In an evacuated capsule adapted for use in an apparatus responding to ambient pressure changes having a frame with a threaded hole, the combination including a dished plate having a modulus of elasticity substantially constant with thermal change and having an outwardly projecting flange, a stem having an axial conical recess fastened to the center of the plate, the apex of the recess being substantially in the plane of the plate for receiving a loosely mounted motion transmitting link at said apex, a second such dished plate having a central hole, a metal tube passing through said central hole, said tube having a central hole, a flange on said tube exteriorly of said plate, a thread on one end of said tube permitting longitudinal adjustment of said tube in said threaded hole in the frame, a heavy washer of material having a modulus of elasticity substantially constant with thermal change resting on said flange and bearing against said dished plate and having a central hole, means on said tube on the opposite side of said plate positioning said flange and heavy washer adjacent said plate, said means including material unwettable by solder, and solder joining the tube, washer and plate, said solder being between said heavy washer and plate and between the edges of said aperture in the plate and said tube.

5. In an evacuated capsule adapted for use in an apparatus responding to ambient pressure changes having a frame with a threaded hole, the combination including a dished plate having a modulus of elasticity substantially constant with thermal change and having an outwardly projecting flange, a stem having an axial conical recess fastened to the center of the plate, the apex of the recess being substantially in the plane of the plate for receiving a loosely mounted motion transmitting link at said apex, a second such dished plate having a central hole, a metal tube passing through said central hole, said tube having a central hole, a flange on said tube exteriorly of said plate, a thread on one end of said tube permitting longitudinal adjustment of said tube in said threaded hole in the frame, a heavy washer of material having a modulus of elasticity substantially constant with thermal change resting on said flange and bearing against said dished plate and having a central hole, means on said tube on the opposite side of said plate positioning said flange and heavy washer adjacent said plate, said means including material unwettable by solder, solder joining the tube, washer and plate, said solder being between said heavy washer and plate and between the edges of said aperture in the plate and said tube, and a link yieldably held in said conical recess for transmitting movement of said capsule to said apparatus.

References Cited in the file of this patent

UNITED STATES PATENTS

| Number | Name | Date |
|---|---|---|
| 911,387 | Eisenstein | Feb. 2, 1909 |
| 1,338,436 | Green | Apr. 27, 1920 |
| 2,048,167 | Pilling et al. | July 21, 1936 |
| 2,072,489 | Straumann | Mar. 2, 1937 |
| 2,162,308 | Jenny | June 13, 1939 |
| 2,174,171 | Wasson et al. | Sept. 26, 1939 |
| 2,177,564 | Havill | Oct. 24, 1939 |
| 2,235,110 | Ottley | Mar. 18, 1941 |
| 2,311,900 | Newell | Feb. 23, 1943 |
| 2,359,676 | Raney | Oct. 3, 1944 |
| 2,515,185 | Bieber et al. | July 18, 1950 |

FOREIGN PATENTS

| 114,424 | Australia | Dec. 17, 1941 |